United States Patent [19]
Wenger et al.

[11] Patent Number: 4,777,006
[45] Date of Patent: Oct. 11, 1988

[54] METHOD AND APPARATUS FOR BLOW MOLDING CURVED HOLLOW BODIES MADE OF PLASTICS

[75] Inventors: Günter Wenger, Rottenacker; Robert Schick, Munderkingen, both of Fed. Rep. of Germany

[73] Assignee: Etimex Kunststoffwerke GmbH, Fed. Rep. of Germany

[21] Appl. No.: 52,974

[22] Filed: May 22, 1987

[30] Foreign Application Priority Data

May 31, 1986 [DE] Fed. Rep. of Germany ....... 3618446

[51] Int. Cl.$^4$ ................ B29C 53/08; B29C 49/04
[52] U.S. Cl. .................... 264/526; 264/295; 264/339; 264/531; 264/571; 425/388; 425/392; 425/525
[58] Field of Search ............ 264/294, 531, 295, 339, 264/571, 526; 425/388, 392, 525

[56] References Cited

U.S. PATENT DOCUMENTS

| | | | |
|---|---|---|---|
| 3,408,692 | 11/1968 | Scharch | 264/531 |
| 3,449,480 | 6/1969 | Hough | 264/531 |
| 3,508,295 | 4/1970 | Hough | 264/531 |
| 4,026,983 | 5/1977 | Stockwell | 264/531 |
| 4,118,162 | 10/1978 | Baumgarten | 264/295 |
| 4,242,296 | 12/1980 | Bricker | 264/295 |

FOREIGN PATENT DOCUMENTS 53-121062 10/1978 Japan.

Primary Examiner—Jan H. Silbaugh
Assistant Examiner—Neil M. McCarthy
Attorney, Agent, or Firm—Leydig, Voit & Mayer

[57] ABSTRACT

During blow molding of curved plastic hollow bodies, the parison is first extruded as a whole in a substantially straight line and vertically from top to bottom. The parison is then severed from the extrusion die and the severed parison precurved. Finally, the precurved parison is inserted as a whole into the blow mold and blown. An apparatus for carrying out this method comprises releasable support means for accommodating and holding the parison, curving means for preliminary curving of the parison, tilting means for tilting the support means into the horizontal position and a blow mold, the precurved parison being placed as a whole in one mold half of this blow mold.

3 Claims, 3 Drawing Sheets

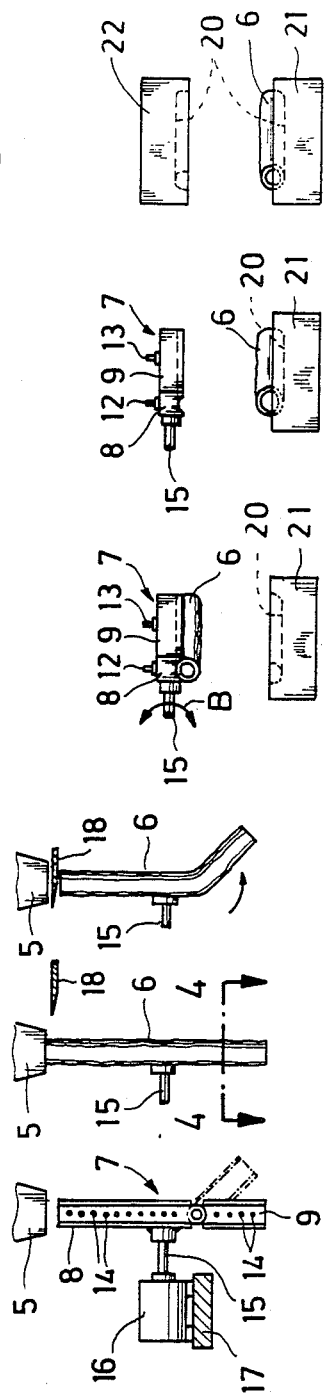
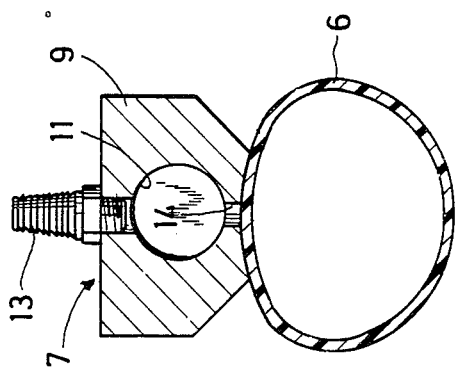

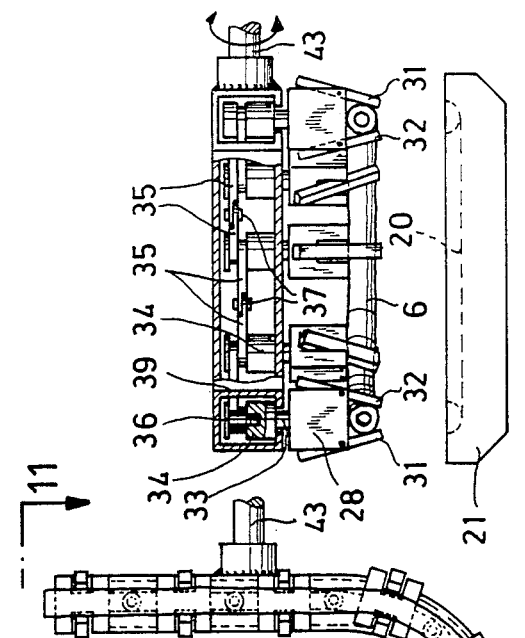
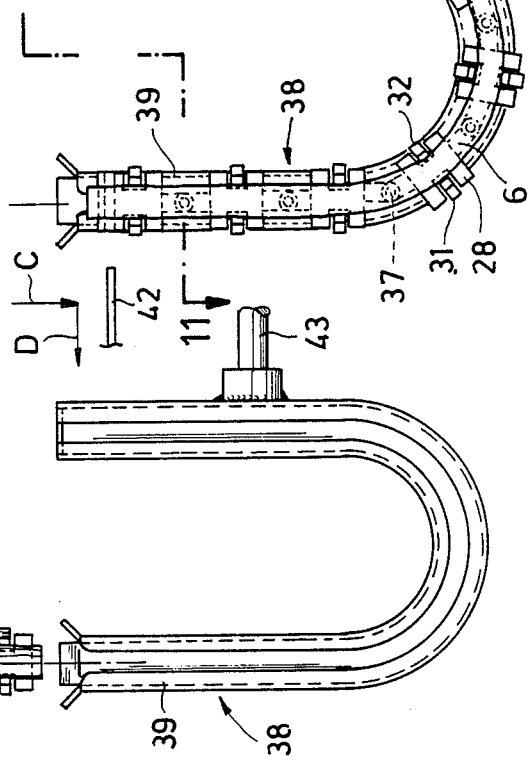
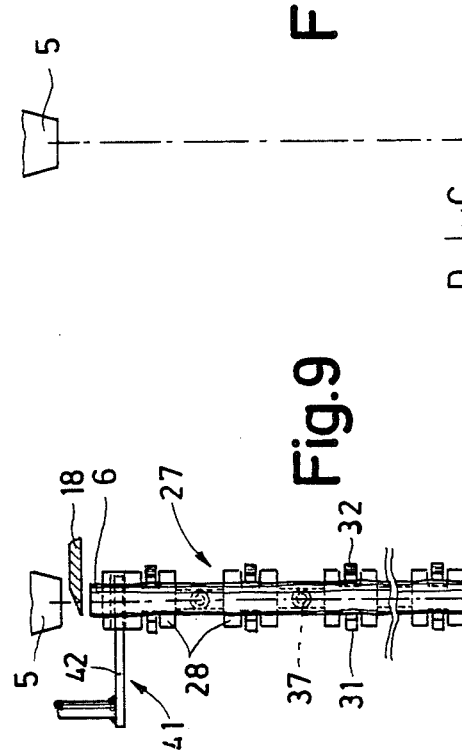

METHOD AND APPARATUS FOR BLOW MOLDING CURVED HOLLOW BODIES MADE OF PLASTICS

The invention relates to a method as defined in the preamble to patent claim 1. In addition, the invention relates to an apparatus as defined in the preamble to patent claim 2.

In a known method and known apparatus of this type (JP-PA No. 53-121062), the extruded parison which is still connected to the extruder die is gripped at its lower, free end by a support pin, is curved or bent into a U shape by displacement of the pin and secured to the inner face of one section of the mold. In this way, it is possible to curve the parison only in one plane but not in three dimensions.

In a further known method for blow molding curved hollow bodies made of plastics (DE-PS No. 29 27 098), the parison is, during its extrusion from the die, immediately inserted into a two-dimensionally or three-dimensionally curved mold cavity in a lower mold section. For this purpose, either the mold section or the die have to be moved accordingly. This has the disadvantage that large masses have to be displaced, i.e. in one case the lower mold section and in the other case the entire extruder which mounts the die. Moreover, the lower part of the parison which is inserted into the lower mold section is cooled to a greater extent than its free, upper section. This means that an unevenly heated parison has to be blown once the upper mold section has been mounted in place and this can lead to hollow bodies which are not completely blown and have differences in their wall thicknesses.

The object of the invention is to remedy these shortcomings and propose a method of the type in question, with which the parison can be curved or bent three-dimensionally, no large masses have to be displaced and the parison does not experience any substantially varying degrees of cooling during the curving process.

This object is accomplished in accordance with the invention by the characterizing features of patent claim 1.

An apparatus for carrying out the inventive method is the subject matter of patent claim 2. Features of preferred embodiments of this apparatus are specified in subclaims 3 to 6.

The following description of preferred embodiments of the invention serves to explain this invention in greater detail in conjunction with the attached drawings, in which FIG. 1 is a schematic side view of an apparatus for blow molding curved plastic hollow bodies;

FIGS. 2 and 3 are various schematic side views of a support means for accommodating and securing a tubular extruded parison;

FIG. 4 is a sectional view along line 4—4 in FIG. 3;

FIG. 5 is a view similar to FIG. 3 showing a bent support means;

FIG. 6 shows the support means pivoted into the horizontal;

FIG. 7 is a view similar to FIG. 6 after transfer of the parison from the support means to the lower mold half of a blow mold;

FIG. 8 is a view similar to FIG. 7 showing an upper mold half for the blow mold;

FIG. 9 is another embodiment of a support means for the parison comprising means for precurving the parison;

FIG. 10 shows the means of FIG. 9 in a different operating position; and

FIG. 11 is a sectional view along line 11—11 in FIG. 10.

Figure 1:
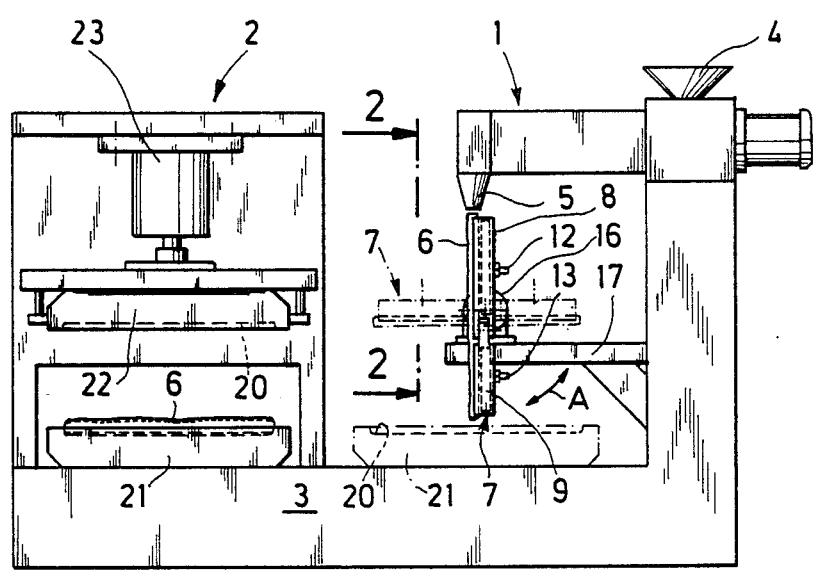

FIG. 1 is a schematic illustration of an extruder 1, which is arranged on a machine frame 3 together with a blow mold 2. Plastic material, for example polyethylene or polypropylene, introduced into a supply funnel 4 is melted in the known manner in the extruder and conveyed to a die 5 comprising an interior mandrel via a transport means which is not illustrated. The plastics material exits vertically from the die from top to bottom in the form of a tubular parison 6 having a predetermined length. Once the parison 6 has the desired extrusion length it is separated from the die 5 at its upper end. This state is illustrated in FIG. 1.

The tubular parison is extruded from the die 5 along a support means 7, the front view of which is illustrated in FIG. 2 as seen in the direction of arrows 2 in FIG. 1. The support means 7 comprises, in the illustrated embodiment, a strip consisting of two articulatedly connected and substantially straight members 8, 9, the cross-sectional form of which is shown in FIG. 4. Both strip members 8, 9 have a cavity 11, which extends longitudinally to the axis of the strip and is closed at both its upper and lower ends. The cavity can be connected via nipples 12, 13 to a reduced pressure or vacuum source, which is not illustrated. Bores 14 lead from the cavity 11 to the front face of the strip members 8, 9.

The connection between the two members 8, 9 is such that it is possible for one member to pivot relative to the other in the plane of drawing of FIG. 2, as indicated by dash-dot lines.

One strip member 8 is connected with the shaft 15 of an electric motor 16 which is itself supported on a table 17 of the machine frame 3. With the aid of the motor 16 the strip-like support means 7 can be swiveled out of the vertical position into a horizontal position indicated in FIG. 1 by dash-dot lines and swiveled back again, in the directions indicated in FIG. 1 by the double-headed arrow A.

The two strip members 8, 9 swivel relative to one another by means of known, for example pneumatic, means which are not illustrated.

As illustrated, the parison 6 is extruded from the die 5 along the support means 7 in the immediate vicinity of the outer openings in the bores 14 in which a vacuum effect may be generated When the parison 6 is extruded to the desired length along the support means 7, a reduced pressure or vacuum is generated in the cavity 11 in the strip members 8, 9 so that the tubular parison 6 is sucked in and held on the support means 7.

Subsequently, the upper end of the parison 6 is separated from the die 5 by cutting means 18 which are known per se and indicated in FIGS. 3 and 5.

The parison 6 is then bent in the manner illustrated in FIG. 5 by swiveling the lower strip member 9.

Subsequently, the motor 16 is actuated to swivel the support means 7, together with the parison 6 held thereon, through 90° into the horizontal in the direction of arrow B (FIG. 6).

As shown in FIGS. 1 and 6, the lower mold half 21 of a blow mold which comprises a mold recess 20 is arranged below the die 5 and the support means. The mold recess 20 is shaped to correspond to the form of the precurved parison 6 (FIG. 5).

By switching off the vacuum in the support means 7, the precurved parison 6 is allowed to drop into the lower mold half 21. Subsequently, cf. FIG. 8, the lower mold half 21 is brought together with an upper mold half 22 which has a corresponding mold recess 20. Once the upper mold half 22 has been placed in position on the lower mold half 21, the parison 6 is blown in a manner known per se to the desired shape of the hollow body.

As illustrated in FIG. 1, the upper mold half 22 is displaceable upwards and downwards by means of a piston-cylinder unit 23 mounted on the machine frame 3. The lower mold half 21, which is first of all located beneath the support means 7 (illustrated in dash-dot lines in FIG. 1), is then moved with the parison 6 inserted therein so that it is below the upper mold half 22. The upper mold half 22 is then lowered onto the lower mold half and the parison 6 blown.

As illustrated and described, only the lower strip member 9 of the support means 7 has to be swiveled to precurve the parison 6 (FIG. 5). A small, e.g. pneumatic, low-powered drive motor would be adequate for this purpose. In contrast to the state of the art, it is not necessary to move any heavy masses using considerable power resources. Since, in addition, the areas of contact between the parison 6 and the support means 7 (cf. FIG. 4) may be designed so that they are relatively small, the parison 6 loses, locally, very little heat to the support means 7 while it is held thereon and so a parison 6 which has an essentially uniform temperature is inserted into the blow mold 21, 22 and then blown with a uniform wall thickness.

In the illustrated embodiment, the parison 6 is bent only once (in the plane of drawing of FIGS. 2, 3 and 5) by swiveling the strip member 9. To achieve a compound curvature the support means 7 must consist of a plurality of articulatedly connected strip members. It is then possible to bend the parison 6 not only in one plane, i.e. two-dimensionally, but also in three dimensions. For this purpose, the joint axis of the relevant strip member must extend at right angles to the joint axis between the strip members 8 and 9 which is illustrated in FIG. 2. This makes it possible to bend the parison 6 out of the plane of drawing of FIGS. 2, 3 and 5. The parison 6 which is curved three-dimensionally is then inserted into the mold halves 21, 22, the mold recesses 20 of which are curved three-dimensionally in a corresponding manner. In this way, relatively complicated shapes can be produced for extrusion blow-molded hollow bodies.

FIGS. 9, 10 and 11 show a different embodiment of a means for supporting and precurving freshly extruded, hot parisons.

A support chain 27 is arranged beneath the die 5 and the cutting means 18 so as to be parallel to the direction of extrusion, i.e. vertical. The members or links of this chain are formed by blocks 28 which are articulatedly connected with one another. As shown in FIG. 10, 10 blocks 28 may, for example, be provided. Only 4 of these blocks are visible in the cut-off illustration of FIG. 9. Each block 28 has two jaws 31, 32 for clamping a parison 6 (FIG. 11). These jaws are pivotally mounted and actuatable by means of a power drive, which is not illustrated and can, for example, be electromagnetic or pneumatic. Pins 33 protrude from the blocks 28 and these pins bear guiding heads 34 on their free ends. In order to produce an articulated link connection, connecting bars 35 extend in two superposed layers between the guiding heads 34. These bars are articulatedly connected to one another via bolts 37 and to the heads 34 via threaded pins 36.

A guide means 38 in the form of a curved profiled tube 39 having a C-shaped cross section is associated with the support chain 27. The interior cross section of the profiled tube 39 is dimensioned such that the tube can accommodate and guide the heads 34 of the blocks 28 with their associated link connections, as illustrated in FIGS. 10 and 11, the blocks 28 with the jaws 31, 32 hereby being guided on the outer side of the tube 39 in accordance with its curvature.

In addition, a power-actuated slide means 41 with a driver arm 42 is provided. The arm 42 may be moved upwards and downwards in the direction of arrow C (FIG. 9) or from side to side in the direction of arrow D.

When moved to the right, the arm 42 is brought into engagement with the upper block 28 of the support chain 27. When the arm is displaced in the direction of arrow C, the support chain 27 bearing the freshly extruded parison 6 is moved into the guide means 38. The parison 6 carried by the jaws 31, 32 of the blocks 28 (FIG. 11) is then bent or curved to the shape of the guide means 38, for example in the shape of a "U".

The guide tube 39 is connected via a shaft 43 with a drive motor, such as the electric motor 16 in FIG. 2. This means that the tube can be turned from the vertical position shown in FIG. 9 into the horizontal position shown in FIG. 11.

Once the support chain 27 bearing the parison 6 has been fully inserted into the guide tube 39, the arm 42 is withdrawn (by displacement in the direction of arrow D). Subsequently, the guide tube 39, together with the support chain 27 and the curved parison 6 held thereby, is swiveled into the horizontal position (FIG. 11), whereupon the jaws 31, 32 are released and the parison 6 can drop into the lower mold half 21 which is ready to receive it. The production process is then continued as described in conjunction with FIGS. 1-8.

Finally, the guide means 38 is returned to the vertical position and the support chain 27 moved back by the arm 42 into the position illustrated in FIG. 9 so that another parison can be extruded and taken up.

In the embodiment illustrated in FIGS. 9-11, the support chain 27 is pressed into the guide tube 39 by the arm 42. Instead, it would be possible to provide a drawing means, for example in the form of a wire extending through the tube 39, on the lowest block 28 of the chain 27. The support chain 27 could then be inserted into the guide means 38 by a pulling action.

Relatively complicated parisons 6 having compound curvatures can also be produced with the aid of a guide means 38 of the type described when the tube 39 is bent accordingly. In particular, three-dimensionally curved parisons can also be manufactured with the guide means 38 when the guide tube 39 is bent in three dimensions. In this case, care must merely be taken that the link connection between the individual blocks 28 of the support chain 27 is also movable in three dimensions. It is then possible, for example, to curve the parisons to the shape of a three-dimensional spiral.

As shown in FIG. 11, the pivotable jaws 31, 32 grip the parison 6 over only a very small area of contact and so the parison loses practically no heat during preliminary curving.

Instead of holding the parison 6 on the blocks 28 with the jaws 31, 32 the blocks can also be designed in a similar manner to the strip members 8, 9 of FIG. 4, i.e. they are connected to a suction means and hold the parison 6 by means of a vacuum or negative pressure. The fundamental mode of operation is not altered in any way by this. On the other hand, the strip members 8, 9 could also have pivotable jaws 31, 32 for holding the parison 6 instead of the bores 14.

Although it has proven particularly favourable to insert the parison 6, which is in a horizontal position (FIGS. 6 and 11), from above into the lower mold half 21, it is also fundamentally possible to avoid swiveling the support means 7 and the guide means 38 into the horizontal position and, instead, to introduce the precurved parison in a more or less vertically aligned position into the mold halves of the blow mold, which must then be arranged such that they are also substantially vertical.

In the illustrated embodiments of the method, the parison 6 is first precurved substantially in the vertical plane and the precurved parison is then tilted into the horizontal. In principle it is also possible, in particular in the embodiment of FIGS. 1 to 8, for the parison to be tilted first of all into the horizontal and then curved. A third possibility is for the parison to be curved and tilted into the horizontal at the same time.

In FIG. 8, a funnel or the like may also be arranged at the inlet end to the tube 39 to facilitate insertion of the support chain 27. Alternatively, a number of blocks 28 of the chain 27 may already be located in the vertical branch of the guide tube 39 during extrusion of the parison 6.

The guide means 38 can also be arranged at the upper end of the support chain 27 according to FIG. 9. In this case, the slide means 41 first withdraws the chain 27 supporting the parison 6 away from the vertical axis of the die 5 and then draws the blocks 28 of the chain 27 one after the other into and through the guide means so that the parison 6 is curved accordingly.

We claim:

1. A method of blow molding curved hollow bodies made of plastic in which a tubular parison is extruded from an extrusion die in a straight line vertically form top to bottom, is curved, inserted into a blow mold, and finally blown in said mold to form said hollow body comprising the sequential steps of:
   (a) extruding the parison adjacent a support and subsequently securing an outer surface of the parison to said support;
   (b) severing the parison after it has been secured to said support;
   (c) providing a curvature ot the parison by altering the shape of said support; and
   (d) inserting the curved parison into the blow mold by releasing said parison from said support.

2. The method of blow molding curved hollow bodies according to claim 1 wherein the parison is secured to the outer surface of said support by a reduced pressure between the parison and said support.

3. The method of blow molding curved hollow bodies according to claim 1 wherein said support comprises two members secured to and pivotable with respect to one another.

* * * * *